(12) United States Patent
Zhong et al.

(10) Patent No.: US 10,791,741 B2
(45) Date of Patent: Oct. 6, 2020

(54) PLANT GROWTH REGULATOR

(71) Applicant: JIANGSU HUIFENG BIO TECHNOLOGY CO., LTD., Yancheng, Jiangsu (CN)

(72) Inventors: Hangen Zhong, Yancheng (CN); Zihua Ji, Yancheng (CN); Hongjin Ji, Yancheng (CN); Wei Hua, Yancheng (CN); Dinggen Ji, Yancheng (CN); Jianfeng Wei, Yancheng (CN)

(73) Assignee: JIANGSU HUIFENG BIO AGRICULTURE CO., LTD., Jiangsu (CN)

( * ) Notice: Subject to any disclaimer, the term of this patent is extended or adjusted under 35 U.S.C. 154(b) by 76 days.

(21) Appl. No.: 16/307,259

(22) PCT Filed: Nov. 24, 2017

(86) PCT No.: PCT/CN2017/112851
§ 371 (c)(1),
(2) Date: Dec. 5, 2018

(87) PCT Pub. No.: WO2018/059605
PCT Pub. Date: Apr. 5, 2018

(65) Prior Publication Data
US 2019/0297891 A1 Oct. 3, 2019

(30) Foreign Application Priority Data

Sep. 28, 2016 (CN) .......................... 2016 1 0864374
Feb. 28, 2017 (CN) .......................... 2017 1 0112460

(51) Int. Cl.
*A01N 43/82* (2006.01)
*A01N 43/16* (2006.01)

(52) U.S. Cl.
CPC ............. *A01N 43/82* (2013.01); *A01N 43/16* (2013.01)

(58) Field of Classification Search
None
See application file for complete search history.

(56) References Cited

FOREIGN PATENT DOCUMENTS

| CN | 1930962 | A | | 3/2007 |
|----|---------|---|---|--------|
| CN | 102342292 | A | | 2/2012 |
| CN | 102893991 | A | * | 1/2013 |
| CN | 103875698 | A | | 6/2014 |
| CN | 104286020 | A | * | 1/2015 |
| CN | 105340937 | A | | 2/2016 |
| CN | 106472545 | A | | 3/2017 |
| CN | 106993625 | A | | 8/2017 |

OTHER PUBLICATIONS

The Agrochemicals Handbook, 3rd edition, Thidiazuron (Year: 1991).*
Jun. 11, 2018 International Search Report issued in International Patent Application No. PCT/CN2017/112851.

* cited by examiner

*Primary Examiner* — Alton N Pryor
(74) *Attorney, Agent, or Firm* — Oliff PLC

(57) ABSTRACT

The present invention discloses a plant growth regulator. The effective ingredients of the plant growth regulator comprise active components A and B, wherein the active component A is thidiazuron, and the active component B is amino-oligosaccharin. Also provided are a preparation method and use of the composition. Experimental results indicate that the composition of the present invention is effective in regulating the growth, increasing the disease and stress resistance, promoting the health and increasing the yield and quality of crops.

11 Claims, No Drawings

PLANT GROWTH REGULATOR

BACKGROUND

Technical Field

The present invention is mainly applied in the field of agricultural plant protection, and relates to a plant growth regulator composition comprising the active ingredients thidiazuron and amino-oligosaccharin having different mechanisms of action.

Related Art

Thidiazuron is a novel and effective plant growth regulator. After being absorbed by plants, thidiazuron can promote the separation of petioles from stems to cause the falling of mature leaves. Thidiazuron can promote the ethylene production and contribute to the pectin and cellulase activity at a high concentration, and functions as a cytokinin and can induce the differentiation of buds from the plant callus at a low concentration. The structure is shown below:

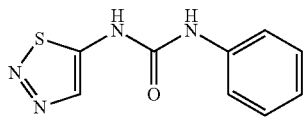 [SMILES: O=C(Nc1ccccc1)Nc1cnns1]

Amino-oligosaccharin, also known as chitooligosaccharide, is a oligosaccharide formed by D-amino cherry sugar linked with P-1,4 glycosidic bond, which is produced through degradation of chitin into chitosan, followed by further degradation, or is a lowly toxic fungicide obtained by microbial fermentation and extraction. Amino-oligosaccharin can inhibit the growth of some fungi, affect the spore germination of fungi, induce the mycelial morphology to change and induce the biochemical changes in the spores. Amino-oligosaccharin can stimulate the genes in plant to produce chitinase, glucanase, guanidin and PR protein with anti-disease effect, and has the function of cell activation, which is conducive to the recovery of the damaged plants, promoting the growth of seedlings, enhancing the stress resistance of crops, and promoting the growth and development of plants.

Currently, the commercially available plant growth regulators are mainly single agents having simple effects.

SUMMARY

An object of the present invention is to provide a plant growth regulator composition having synergistic effect, so as to promote the growth, increase the disease resistance and the yield of crops, and improve the quality of agricultural products. It is found through experiments that the combination of thidiazuron and amino-oligosaccharin has a significant effect in regulating the growth, increasing the yield, improving the disease resistance and improving the quality of crops.

Another object of the present invention is to provide use of the plant growth regulator composition comprising active components A and B in regulating and promoting the growth of crops in the agricultural area.

The objects of the present invention can be achieved through the following measures.

The present invention provides a plant growth regulator composition having synergistic effect. The composition comprises active components A and B, wherein the active component A is thidiazuron, and the active component B is amino-oligosaccharin, and the weight ratio of the active component A to the active component B is 1:(0.02-110).

In a preferred embodiment, the weight ratio of the active component A to the active component B is 1:(0.025-100), and the weight ratio is further preferably 1:(0.03-90) and further preferably 1:(0.1-80), to achieve a better effect.

The present invention finds through experiment that the composition is useful in regulating the growth of crops, promoting the health of crops, enhancing the disease resistance of crops and improving the quality of crop products.

In a preferred embodiment, the weight ratio between the components A and B may be adjusted to any one of 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:22, 1:23, 1:24, 1:25, 1:26, 1:27, 1:28, 1:29, 1:30, 1:31, 1:32, 1:33, 1:34, 1:35, 1:36, 1:37, 1:38, 1:39, 1:40, 1:41, 1:42, 1:43, 1:44, 1:45, 1:46, 1:47, 1:48, 1:49, 1:50, 1:51, 1:52, 1:53, 1:54, 1:55, 1:56, 1:57, 1:58, 1:59, 1:60, 1:61, 1:62, 1:63, 1:64, 1:65, 1:66, 1:67, 1:68, 1:69, 1:70, 1:71, 1:72, 1:73, 1:74, 1:75, 1:76, 1:77, 1:78, 1:79, 1:80, 1:81, 1:81, 1:82, 1:83, 1:84, 1:85, 1:86, 1:87, 1:88, 1:89, 1:90, 1:91, 1:92, 1:93, 1:94, 1:95, 1:96, 1:97, 1:98, 1:99, 1:100, and 1:110 at will, or be selected from a range delimited by any two ratios above. The above ratio may be weight ratio or weight/volume ratio, or molar ratio.

The present invention provides use of a composition comprising a component A (thidiazuron) and a component B (amino-oligosaccharin) in promoting or regulating the growth of crops in the agricultural area, particularly in regulating the growth, improving the resistance to disease, increasing the yield, and improving the quality of melon and cherry.

For the purpose of fully exerting the advantageous effects of the present invention, the composition of the present invention may also be used in combination with other pesticides (such as fungicides, insecticides, herbicides, and plant growth regulators), fertilizers and so on, all of which are commonly used pesticides or fertilizers disclosed in the prior art.

Suitable fertilizers include: inorganic fertilizers or/and organic fertilizers. Specific examples of fertilizers include mixtures containing at least one of a) one or more major elements selected from nitrogen, phosphorus, and potassium; b) one or more trace elements selected from copper, iron, manganese, zinc, boron, calcium, magnesium, sulfur and the like; and c) at least one of humic acid and amino acids.

The composition of the present invention may be prepared into a pesticidally acceptable formulation with the active ingredients and a pesticide adjuvant. The content of the active ingredients in the composition is 0.2-80%, and preferably 0.5-50% by weight.

The composition may specifically comprise a pesticide adjuvant, such as one or more of a carrier, a solvent, a dispersant, a wetting agent, a binder, a thickener, an adhesive, a surfactant and the like. A commonly used adjuvant may be blended during application.

The suitable adjuvant may be a solid or liquid that is generally a material commonly used in the preparation of formulations, for example, a natural or regenerated mineral substance, a solvent, a dispersing agent, a wetting agent, an adhesive, a thickener, a binder or a fertilizer.

The composition of the present invention may be applied by administering the composition of the present invention to the aboveground parts of plants, in particular to the leaves or leaf surface thereof. The composition may be used for seed impregnation, or applied onto the surface of the objects to be controlled. The locus where the plant is growing, for example rice field, may be impregnated with a liquid formulation of the composition, or the composition is applied in solid form to the soil, for example, in granular form (soil application), where the composition penetrates the plant through the roots via the soil (systemic action).

The composition may be used by applying the active ingredients alone or in admixture with additives (pesticide adjuvant).

The composition of the present invention may be prepared into pesticidally acceptable formulations, for example, an aqueous solution, a suspension, a soluble concentrate, an oily suspension, microcapsules, a microemulsion, a suspension, or a soluble powder. Depending on the properties of the compositions, the objectives intended to be achieved by applying the compositions, and the environmental conditions, the compositions may be applied by spraying, atomizing, dusting, scattering, or pouring.

Suitable microcapsule formulations in the present invention include: microcapsule suspensions, microcapsule suspension-suspensions, microcapsule suspension-aqueous emulsions and the like, where the wall of the microcapsule (i.e., the capsule core) encloses a mixture of the active ingredients thidiazuron and amino-oligosaccharin at a certain ratio, that is, the two are mixed to prepare into microcapsules. The microcapsules are stably dispersed and suspended at a certain concentration in water as a continuous phase to form a microcapsule suspension. Alternatively, one of the active ingredients is prepared into a microcapsule suspension, and the other active ingredient is prepared into an emulsion. The two ingredients prepared are mixed, stirred and shaken fully to obtain a microcapsule suspension-suspension or a microcapsule suspension-aqueous emulsion.

The composition of the present invention may be prepared into various formulations through known processes. The active ingredients may be uniformly mixed with an adjuvant such as a solvent or a solid carrier and a surfactant if needed, and ground to prepare a desired formulation.

The solvent may be selected from aromatic hydrocarbons containing preferably 8 to 12 carbon atoms, for example, a xylene mixture, substituted benzene, or a phthalate ester, for example, dibutyl or dioctyl phthalate; aliphatic hydrocarbons, for example, cyclohexane or paraffin; alcohols, glycols and ethers and esters thereof, for example, ethanol, ethylene glycol, and ethylene glycol monomethyl ether; ketones, for example, cyclohexanone; high-polarity solvents, for example, N-methyl-2-pyrrolidone, dimethyl sulfoxide, or dimethyl formamide; and vegetable oils, for example, soy bean oil.

The solid carrier includes for example natural mineral fillers generally used in suspensions and dispersible agents, for example, talc, kaolin, montmorillonite or activated bauxite. To manage the physical properties of the composition, highly dispersive silicic acid or highly dispersive absorbent polymer carrier may also be added, for example, granular adsorptive carrier or non-adsorptive carrier. The suitable granular adsorptive carrier is porous, for example, pumice, soapy clay or bentonite. The suitable non-adsorptive carrier includes for example calcite or sand. Moreover, a large amount of inorganic or organic material that is pre-prepared into granules and especially dolomite may be used as the carrier.

As desired by the chemical nature of the active ingredients in the composition according to the present invention, the suitable surfactant includes lignin sulfonic acid, naphthalenesulfonic acid, phenolsulfonic acid, alkaline earth metal or amine salts, alkylarylsulfonates, alkylsulfates, alkylsulfonates, fatty alcohol sulfates, fatty acids and ethylene glycol sulfated fatty alcohol ethers, condensation products of sulfonated naphthalene and naphthalene derivatives with formaldehyde, condensation products of naphthalene or naphthalenesulfonic acid with phenol and formaldehyde, polyoxyethylene octyl phenyl ethers, ethoxylated iso-octylphenol, octylphenol, nonylphenol, alkylaryl polyethylene glycol ethers, tributylphenyl polyethylene glycol ether, tristearylphenyl polyethylene glycol ether, alkylaryl polyether alcohols, ethoxylated castor oil, polyoxyethylene alkyl ethers, condensation products of ethylene oxide, ethoxylated polyoxypropylene, polyethylene glycol ether laurate acetal, sorbates, waste lignin sulfite liquor, and methyl cellulose.

Plants in the present invention include, but are not limited to, melon or cherry.

The two active ingredients in the composition of the present invention have a synergistic effect, such that the activity of the composition is obviously higher than the respective activity or expected sum of the respective activity of single compounds alone. The composition of the present invention exhibits the following additional features. The composition of the present invention is effective in regulating the growth, increasing the disease and stress resistance, promoting the health, increasing the yield, and improving the quality of crops.

DETAILED DESCRIPTION

To make the objects, the technical solution, and advantages of the present invention clearer, the present invention is described in further detail with reference to examples. It should be understood that the specific examples described herein are merely provided for illustrating, instead of limiting the present invention. Any modifications and equivalent improvements and substitutions can be made thereto without departing from the spirit and principle of the present invention, which are all fall within the protection scope of the present invention.

The percentages given in all the formulations in the examples below are all weight percentages. The various formulations are processed from the composition of the present invention by a process known in the prior art which may be varied as desired.

I. PREPARATION EXAMPLES OF FORMULATIONS (I) Processing and Examples of Suspensions The active ingredients amino-oligosaccharin and thidiazuron were uniformly mixed with a dispersing agent, a wetting agent, a thickener, water and other components in proportion, and ground and/or high-speed sheared to give a semi-finished product, which was analyzed, supplemented with water, mixed uniformly, and filtered, to obtain a finished product.

Example 1: 30.5% thidiazuron.amino-oligosaccharin Suspension thidiazuron 0.5%, amino-oligosaccharin 30%, alkylaryl polyglycol ether 4%, fatty alcohol sulphate 7%, cyclohexanone 5%, and water q.s. to 100%.

Example 2: 3.1% thidiazuron.amino-oligosaccharin Suspension thidiazuron 0.1%, amino-oligosaccharin 3%, lauric acid polyethylene glycol ether acetal 8%, propylene glycol 4%, ammonium sulfate 4%, and water q.s. to 100%.

Example 3: 10.25% thidiazuron.amino-oligosaccharin Suspension thidiazuron 10%, amino-oligosaccharin 0.25%, sodium alkyl benzene sulfonate 2%, isopropylene glycol 6%, sodium ligninsulfonate 3%, fatty alcohol polyoxyethylene ether phosphate 5%, and water q.s. to 100%.

(II) Processing and Examples of Microcapsules

The active ingredients amino-oligosaccharin and thidiazuron were mixed at a certain ratio and prepared into microcapsules. The microcapsules are stably dispersed and suspended at a certain concentration in water as a continuous phase to form a microcapsule suspension. Alternatively, one of the active ingredients is prepared into a microcapsule suspension, and the other active ingredient is prepared into an emulsion. The two ingredients prepared are mixed, stirred and shaken fully to obtain a microcapsule suspension-suspension or a microcapsule suspension-aqueous emulsion.

Example 4: 5.1% thidiazuron.amino-oligosaccharin Microcapsule Suspension thidiazuron 0.1%, amino-oligosaccharin 5%, triphenyl phosphite 5.7%, lactic acid glyceride 5%, polyoxyethylene castor oil 4%, turpentine-based vegetable oil 10%, Xantham gum 2.1%, tolylene diisocyanate 11%, acrylic acid-acrylate copolymer 5%, isopropylene glycol 3%, sodium benzoate 1%, and water q.s. to 100%.

Example 5: 1.1% thidiazuron.amino-oligosaccharin Microcapsule Suspension-Suspension thidiazuron 0.1%, amino-oligosaccharin 1%, turpentine-based vegetable oil 12%, polyoxyethylene lauryl ether 4%, glycerin fatty acid ester 3%, the antifreezer glycerol 5%, potassium dihydrogen phosphate 2%, formaldehyde-urea 14%, sodium ligninsulfonate 3%, Carrageenan 0.2%, sodium benzoate 0.8%, and water q.s. to 100%.

Example 6: 6.2% thidiazuron.amino-oligosaccharin Microcapsule Suspension-Aqueous Emulsion thidiazuron 6%, amino-oligosaccharin 0.2%, sodium ligninsulfonate 5%, salad oil 16%, ethylenediamine 2%, fatty acid polyoxyethylene ester 3%, gelatin 13%, ethanol 4%, sodium methyl naphthalene sulfonate-formaldehyde condensate 6%, and water q.s. to 100%.

(III) Processing and Examples of Soluble Powders

A mixture of the active ingredients thidiazuron and amino-oligosaccharin at a certain ratio was placed in a vessel together with a surfactant, an adjuvant and a filler, and fully stirred, to obtain a soluble powder.

Example 7: 4.05% thidiazuron.amino-oligosaccharin Soluble Powder thidiazuron 0.05%, amino-oligosaccharin 4%, lignosulfonate 5%, sodium dodecyl benzene sulfonate 3%, and bentonite q.s. to 100%.

Example 8: 8.2% thidiazuron.amino-oligosaccharin Soluble Powder thidiazuron 0.2%, amino-oligosaccharin 8%, sodium lauryl sulfate 4%, sodium ligninsulfonate 3%, polycarboxylate 4%, and white carbon black q.s. to 100%.

Example 9: 1.05% thidiazuron.amino-oligosaccharin Soluble Powder thidiazuron 1%, amino-oligosaccharin 0.05%, shikakai powder 1%, alkyl aryl polyoxyethylene ether 3%, and diatomite q.s. to 100%.

(IV) Processing and Examples of Aqueous Solutions

The active ingredients and an adjuvant were added to a reactor, added up with water, and stirred until uniform, to obtain a thidiazuron.amino-oligosaccharin aqueous solution.

Example 10: 9.1% thidiazuron.amino-oligosaccharin Aqueous Solution thidiazuron 0.1%, amino-oligosaccharin 9%, dimethyl sulfoxide 15%, sodium alkyl sulfate 8%, and water q.s. to 100%.

Example 11: 0.2% thidiazuron.amino-oligosaccharin Aqueous Solution 0.1% raw thidiazuron and 6% isopropylene glycol were added to a reactor, and stirred for 20 min. 0.1% amino-oligosaccharin was then added and stirred for 30 min until it was completely dissolved. 13% calcium dodecylbenzenesulfonate was added and add up with water q.s. to 100%.

(V) Processing and Examples of Soluble Concentrates

The active ingredients amino-oligosaccharin and thidiazuron were fully stirred with a solvent, an emulsifying agent, a dispersing agent, an anti-freezing agent, water and so on at a ratio defined by the formulation, in a water wath at 20-100° C., until a clear liquid was obtained which was a soluble concentrate.

Example 12: 7.1% thidiazuron.amino-oligosaccharin Soluble Concentrate thidiazuron 0.1%, amino-oligosaccharin 7%, Tween 10%, cyclohexanone 15%, azone 5%, ethylene glycol 5%, and water q.s. to 100%.

Example 13: 2.1% thidiazuron.amino-oligosaccharin Soluble Concentrate thidiazuron 0.1%, amino-oligosaccharin 2%, dibenzyl biphenyl polyoxyethylene ether 8%, isopropylene glycol 14%, ethylene glycol 5%, urea 6%, and water q.s. to 100%.

Example 14: 0.55% thidiazuron·amino-oligosaccharin Soluble Concentrate thidiazuron 0.5%, amino-oligosaccharin 0.05%, calcium dodecylbenzenesulfonate 11%, ethylene glycol 4%, cyclohexanone 13%, N,N-dimethyl formamide 6%, and water q.s. to 100%.

Example 15: 10.2% thidiazuron·amino-oligosaccharin Soluble Concentrate thidiazuron 10%, amino-oligosaccharin 0.2%, xylene 7%, alkylphenol polyoxyethylene ether 11%, glycerol 4%, silicone defoamer 2%, and water q.s. to 100%.

II. EFFICIENCY VERIFICATION TEST (I) Bioassay Examples

1. Comprehensive Test on Growth Regulation for Melon by Thidiazuron Combined with Amino-Oligosaccharin The thidiazuron and amino-oligosaccharin were diluted with acetone to give a series of concentrations, and the crops were sprayed in the flowering phase to determine the effect of each concentration on crop growth in the field, so as to make a comprehensive evaluation with respect to the carpopodium diameter, fruit setting rate, disease inhibition rate, quality, and yield of the crops.

Carpopodium diameter increase rate=(Plant height in water control group−Plant height in treatment group)/Plant height in water control group*100%

Fruit setting increase rate=(Stem diameter in treatment group−Stem diameter in water control group)/Stem diameter in water control group*100%

Disease reduction rate=(Disease index in water control group−Disease index in treatment group)/Disease index in water control group*100%

Single fruit weight increase rate=(weight in treatment group−quality in water control group)/weight in water control group*100%

Central sugar increase rate=(Central sugar content in treatment group−Central sugar content in water control group)/Central sugar content in water control group*100%

TABLE 1

Summary of comprehensive test on growth regulation for melon by thidiazuron combined with amino-oligosaccharin

| Ratio | Amount (a.i.g/ha) | Carpopodium diameter (mm) | Increase rate (%) | Fruit setting rate (%) | Increase rate (%) | Anthracnose index | Reduction rate (%) | Single fruit weight (kg) | Increase rate (%) | Central sugar content (%) | Increase rate (%) |
|---|---|---|---|---|---|---|---|---|---|---|---|
| Pyraclo:S = 1:110 | 42 mg/kg | 6.90 | 7.8 | 29.0 | 16.4 | 13.39 | 37.9 | 1.11 | 17.2 | 9.98 | 14.4 |
| Pyraclo:S = 1:100 | 42 mg/kg | 6.93 | 8.3 | 29.4 | 18.0 | 12.31 | 42.9 | 1.15 | 20.9 | 10.15 | 16.4 |
| Pyraclo:S = 1:90 | 42 mg/kg | 6.95 | 8.6 | 29.5 | 18.5 | 11.93 | 44.7 | 1.16 | 22.2 | 10.25 | 17.6 |
| Pyraclo:S = 1:80 | 42 mg/kg | 6.97 | 8.9 | 29.7 | 19.2 | 11.63 | 46.0 | 1.18 | 24.5 | 10.44 | 19.7 |
| Pyraclo:S = 1:70 | 42 mg/kg | 6.99 | 9.2 | 29.8 | 19.8 | 11.23 | 47.9 | 1.20 | 26.3 | 10.55 | 21.0 |
| Pyraclo:S = 1:60 | 42 mg/kg | 7.01 | 9.5 | 30.0 | 20.4 | 11.06 | 48.7 | 1.22 | 27.9 | 10.70 | 22.7 |
| Pyraclo:S = 1:50 | 42 mg/kg | 7.03 | 9.9 | 30.1 | 21.0 | 10.39 | 51.8 | 1.23 | 29.0 | 10.73 | 23.1 |
| Pyraclo:S = 1:40 AM | 42 mg/kg | 7.08 | 10.6 | 30.3 | 21.6 | 9.19 | 57.4 | 1.25 | 31.6 | 10.84 | 24.3 |
| Pyraclo:S = 1:30 AM | 42 mg/kg | 7.11 | 11.1 | 30.4 | 22.1 | 8.69 | 59.7 | 1.25 | 31.8 | 10.94 | 25.5 |
| Pyraclo:S = 1:20 AM | 42 mg/kg | 7.09 | 10.8 | 30.7 | 23.3 | 10.49 | 51.3 | 1.26 | 32.4 | 10.92 | 25.2 |
| Pyraclo:S = 1:10 AM | 42 mg/kg | 7.05 | 10.2 | 30.7 | 23.1 | 10.17 | 52.8 | 1.24 | 30.6 | 10.80 | 23.8 |
| Pyraclo:S = 1.1 | 42 mg/kg | 7.03 | 9.9 | 30.6 | 22.9 | 10.55 | 51.0 | 1.24 | 30.1 | 10.59 | 21.4 |
| Pyraclo:S = 10:1 | 42 mg/kg | 7.01 | 9.6 | 30.3 | 21.7 | 10.85 | 49.7 | 1.23 | 29.0 | 10.48 | 20.2 |
| Pyraclo:S = 20:1 | 42 mg/kg | 7.00 | 9.3 | 30.0 | 20.6 | 11.21 | 48.0 | 1.21 | 27.7 | 10.31 | 18.2 |
| Pyraclo:S = 30:1 | 42 mg/kg | 6.97 | 8.9 | 29.9 | 20.2 | 11.74 | 45.6 | 1.19 | 25.7 | 10.25 | 17.6 |
| Pyraclo:S = 40:1 | 42 mg/kg | 6.95 | 8.6 | 29.7 | 19.4 | 12.18 | 43.5 | 1.18 | 24.0 | 10.13 | 16.2 |
| Pyraclo:S = 50:1 | 42 mg/kg | 6.93 | 8.3 | 29.1 | 16.8 | 12.46 | 42.2 | 1.16 | 22.5 | 10.08 | 15.6 |
| Pyraclo:S = 60:1 | 42 mg/kg | 6.86 | 7.2 | 28.6 | 14.7 | 13.32 | 38.2 | 1.14 | 19.7 | 10.00 | 14.7 |
| Pyraclo:S = 70:1 | 42 mg/kg | 6.77 | 5.8 | 27.9 | 12.1 | 14.06 | 34.8 | 1.12 | 17.8 | 9.91 | 13.7 |
| Thidiazuron | 42 mg/kg | 6.65 | 4.0 | 27.0 | 8.6 | 17.76 | 17.6 | 1.03 | 8.9 | 9.36 | 7.4 |
| Amino-oligosaccharin | 42 mg/kg | 6.68 | 4.3 | 26.7 | 7.3 | 15.48 | 28.2 | 1.05 | 10.6 | 9.43 | 8.1 |
| Water control (CK) | — | 6.4 | — | 24.9 | — | 21.56 | — | 0.95 | — | 8.72 | — |

Note:

in the table "Pyraclo" is an abbreviation for "thidiazuron", and "S" is an abbreviation for "amino-oligosaccharin".

Application time: flowering phase, during which no disease is developed for melons. Time of application: 1.

The present inventors find through experiments that thidiazuron and amino-oligosaccharin have a good synergistic effect therebetween. The combinations of thidiazuron with amino-oligosaccharin at various ratios have an obvious growth regulation effect on melons, compared with thidiazuron and amino-oligosaccharin alone, and water control. The growth regulation effect on melons is obvious and mainly manifested as follows. The combination of the two components can increase the fruit setting rate, increase the weight of single fruits to enhance the yield; increase the carpopodium diameter; improve the disease resistance, raise the central sugar content in melons, and improve the quality. Also, the present inventors find that when the ratio of thidiazuron:S-elicitor is 1:100 and the ratio of thidiazuron:S-elicitor is greater than 50:1, the effects on the melons in terms of carpopodium diameter, fruit setting rate, disease index, sugar content and weight and other indicators are gradually reduced.

II. FIELD EFFICIENCY VERIFICATION TEST

Comprehensive Test of Yield Increase for Cherries by Thidiazuron Combined with Amino-Oligosaccharin in Field Application time: formulation examples of the present invention were sprayed in the expanding period, and the results were an average of three replicates.

TABLE 2

Summary of comprehensive test on growth regulation for cherries by thidiazuron combined with amino-oligosaccharin

| | | Comprehensive test on growth regulation for cherries | | | | | |
|---|---|---|---|---|---|---|---|
| Example | Amount (a.i.g/ha) | Anthracnose index | Prevention effect (%) | Grain weight (g) | Increase rate (%) | Refractive sugar (%) | Increase rate (%) |
| Example 1 | 33 mg/kg | 15.37 | 20.4 | 208.34 | 12.07 | 10.14 | 13.6 |
| Example 2 | 33 mg/kg | 14.92 | 22.7 | 208.72 | 12.27 | 10.18 | 14.0 |
| Example 3 | 33 mg/kg | 14.88 | 22.9 | 209.29 | 12.58 | 10.20 | 14.2 |
| Example 4 | 33 mg/kg | 14.65 | 24.1 | 209.67 | 12.78 | 10.23 | 14.6 |
| Example 5 | 33 mg/kg | 14.24 | 26.2 | 209.67 | 12.78 | 10.25 | 14.8 |
| Example 6 | 33 mg/kg | 13.81 | 28.5 | 210.05 | 12.99 | 10.28 | 15.1 |
| Example 7 | 33 mg/kg | 13.47 | 30.2 | 210.24 | 13.09 | 10.31 | 15.4 |
| Example 8 | 33 mg/kg | 12.94 | 32.9 | 210.62 | 13.30 | 10.33 | 15.7 |
| Example 9 | 33 mg/kg | 13.24 | 31.4 | 212.33 | 14.22 | 10.31 | 15.5 |
| Example 10 | 33 mg/kg | 13.60 | 29.5 | 211.95 | 14.01 | 10.28 | 15.1 |
| Example 11 | 33 mg/kg | 14.01 | 27.4 | 211.19 | 13.60 | 10.24 | 14.7 |
| Example 12 | 33 mg/kg | 14.33 | 25.7 | 210.24 | 13.09 | 10.22 | 14.5 |
| Example 13 | 33 mg/kg | 14.47 | 25.0 | 208.72 | 12.27 | 10.20 | 14.2 |
| Example 14 | 33 mg/kg | 14.77 | 23.5 | 208.91 | 12.38 | 10.19 | 14.1 |
| Example 15 | 33 mg/kg | 15.20 | 21.3 | 208.15 | 11.97 | 10.17 | 13.9 |
| 0.2% thidiazuron soluble concentrate | 33 mg/kg | 17.91 | 7.2 | 196.56 | 5.73 | 9.48 | 6.2 |
| 5% amino-oligosaccharin aqueous solution | 33 mg/kg | 16.24 | 15.8 | 199.41 | 7.27 | 9.58 | 7.3 |
| Water control (CK) | — | 19.30 | — | 185.90 | — | 8.93 | — |

According to the experimental data in Table 2, the product of the present invention is effective in increasing the grain weight, enhancing the disease resistance, enhancing the sugar content, and improving the quality of cherries.

What is claimed is:

1. A plant growth regulator composition, comprising active components A and B, wherein the active component A is thidiazuron, and the active component B is amino-oligosaccharin, wherein the activity of active components A and B combined are greater than the sum of the activity of active components A and B alone.

2. The composition according to claim 1, wherein the weight ratio of the active component A to the active component B is 1:0.025-100.

3. The composition according to claim 2, wherein the weight ratio of the active component A to the active component B is 1:0.03-90.

4. The composition according to claim 3, wherein the weight ratio of the active component A to the active component B is 1:0.1-80.

5. The composition according to claim 1, which is in a pesticidally acceptable formulation prepared with the active ingredients and an adjuvant.

6. The composition according to claim 5, wherein the formulation is an aqueous solution, a suspension, a soluble concentrate, an oily suspension, a microcapsule formulation, a microemulsion, a suspension or a soluble powder.

7. The composition according to claim 5, wherein the content of the active ingredients in the composition is 0.2-80% by weight of the total composition.

8. The composition according to claim 7, wherein the content of the active ingredients in the composition is 0.5-50% by weight of the total composition.

9. The method comprising applying the composition according to claim 1 in promoting or regulating the growth of crops in the agricultural area.

10. The method according to claim 9 on melons or cherries.

11. The composition according to claim 1, wherein the weight ratio of the active component A to the active component B is 1:0.02-110.

* * * * *